UNITED STATES PATENT OFFICE.

CHARLES O. GREEN, WILLIAM P. WICKLINE, AND JAMES B. EATON, OF CENTERPOINT, TEXAS.

MEDICATED SALT ROCK.

SPECIFICATION forming part of Letters Patent No. 672,672, dated April 23, 1901.

Application filed July 20, 1900. Serial No. 24,334. (No specimens.)

*To all whom it may concern:*

Be it known that we, CHARLES O. GREEN, WILLIAM P. WICKLINE, and JAMES B. EATON, citizens of the United States, residing at Centerpoint, in the county of Kerr and State of Texas, have invented new and useful Improvements in Medicated Salt Rock, of which the following is a specification.

The object of our invention is to provide an improved medicated salt rock to be used for keeping cattle, horses, and other live stock in good condition, to serve as a tonic and blood-purifier, also to expel worms from the stomach and intestines, and to eradicate ticks and vermin.

Other purposes of the invention will appear from the following description of the manner of making and using the compound.

The formula for our improved medicated salt rock is as follows: Salt, (sodium chlorid,) 54.9375 per cent.; cement, 40 per cent.; nitrate of potash, .625 per cent.; santonin, .0625 per cent.; powdered nux vomica, .625 per cent.; powdered gentian, .625 per cent.; sulfate of iron, .625 per cent.; sulfur, 2.5 per cent.; total, 100 per cent. We would have it understood, however, that the above-stated proportions of the several ingredients may be varied without affecting the generally beneficial properties of the compound as a salt-cake and "condition" composition for stock. In compounding the mixture any suitable cement may be employed together with a sufficient quantity of water to make a plastic mass, into which the other ingredients are to be stirred in such manner as to produce a uniformly-blended compound to harden into rock form, the cement serving as a binder or adhesive agent. The chlorid of sodium also aids to some extent in agglutinating the compound, and the large proportion of this salt renders the "rock" attractive to stock and furnishes a valuable aid to digestion. Referring to the other ingredients of the compound, the nitrate of potash is diuretic and cooling to the blood. Santonin is a valuable and reliable vermicide. The nux vomica, gentian, and iron are excellent tonics. They assist digestion and aid in purifying the blood. Sulfur is an alterative, germicide, and blood-purifier.

Our compound above described is put up in blocks or cakes of suitable dimensions and weight for convenient use in the feed-box or elsewhere—say in two, five, ten, and twenty pound blocks, as may be preferred. The rock may be kept in the animals' feed-box, or it may be conveniently placed where they have heretofore "salted" or around their drinking-places or where they generally congregate when resting.

The large proportion of salt contained in this medicated salt rock will induce stock to lick it freely, and the medicinal properties of the other ingredients are so graduated that when the animal has taken what salt is desired it has at the same time received into the system enough medicine to exert a proper action until more salt is needed. When thus employed, it purifies the blood, aids digestion, eradicates worms, keeps off ticks, and maintains the stock in a generally healthy condition. Besides, it furnishes all the salt ordinarily required and gives the most economical and satisfactory results in the care of live stock.

What we claim as our invention is—

The herein-described medicated salt cake for live stock, the same consisting of sodium chlorid, cement, nitrate of potash, santonin, nux vomica, gentian, sulfate of iron and sulfur, in about the proportions specified, all uniformly blended and hardened in rock form, the cement acting as a binder, as set forth.

In testimony whereof we have hereunto set our hands in presence of the subscribing witnesses.

CHARLES O. GREEN.
WILLIAM P. WICKLINE.
JAMES B. EATON.

Witnesses to signatures of Charles O. Green and William P. Wickline:
J. M. BRUFF,
W. A. WALKER.

Witnesses to signature of James B. Eaton:
B. W. SHAW,
W. E. E. FIELDING.